United States Patent Office 3,202,808
Patented Aug. 24, 1965

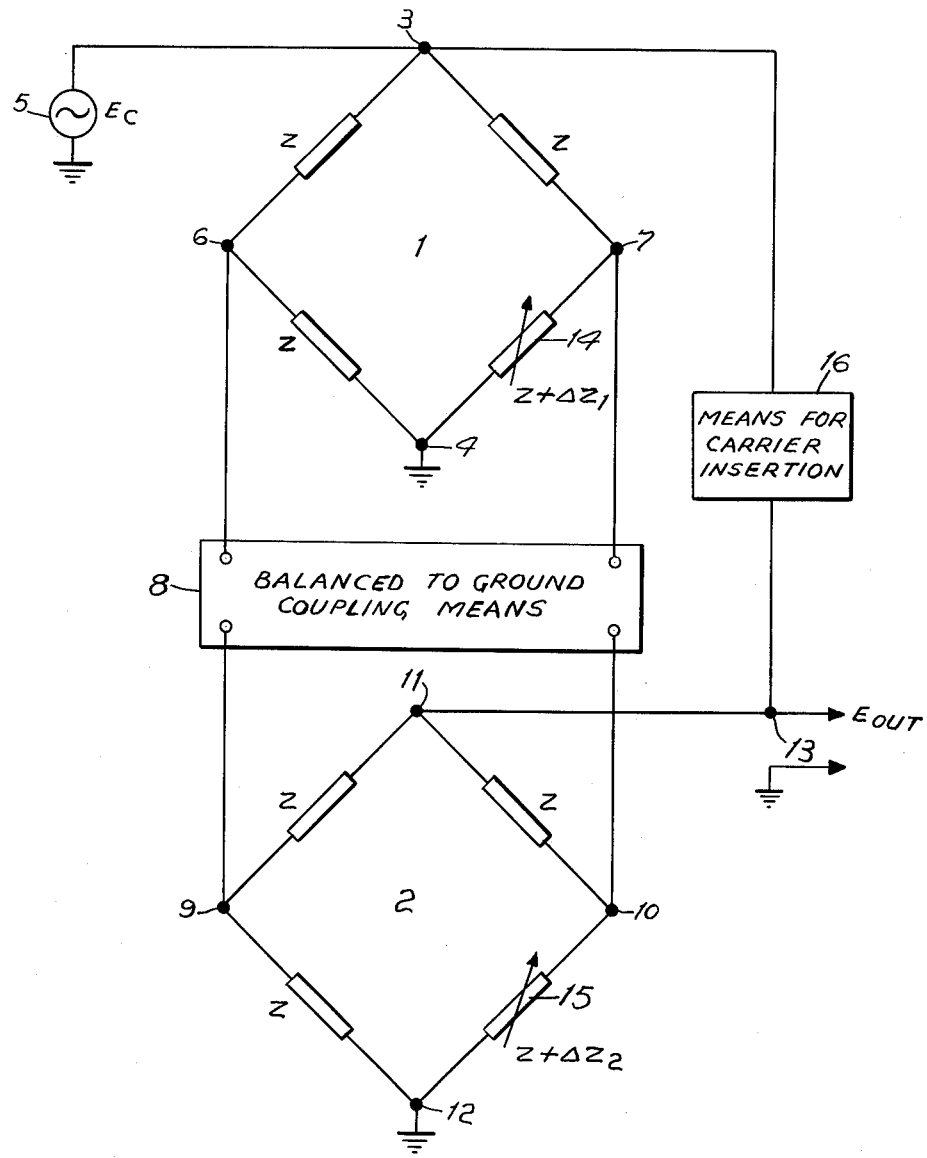

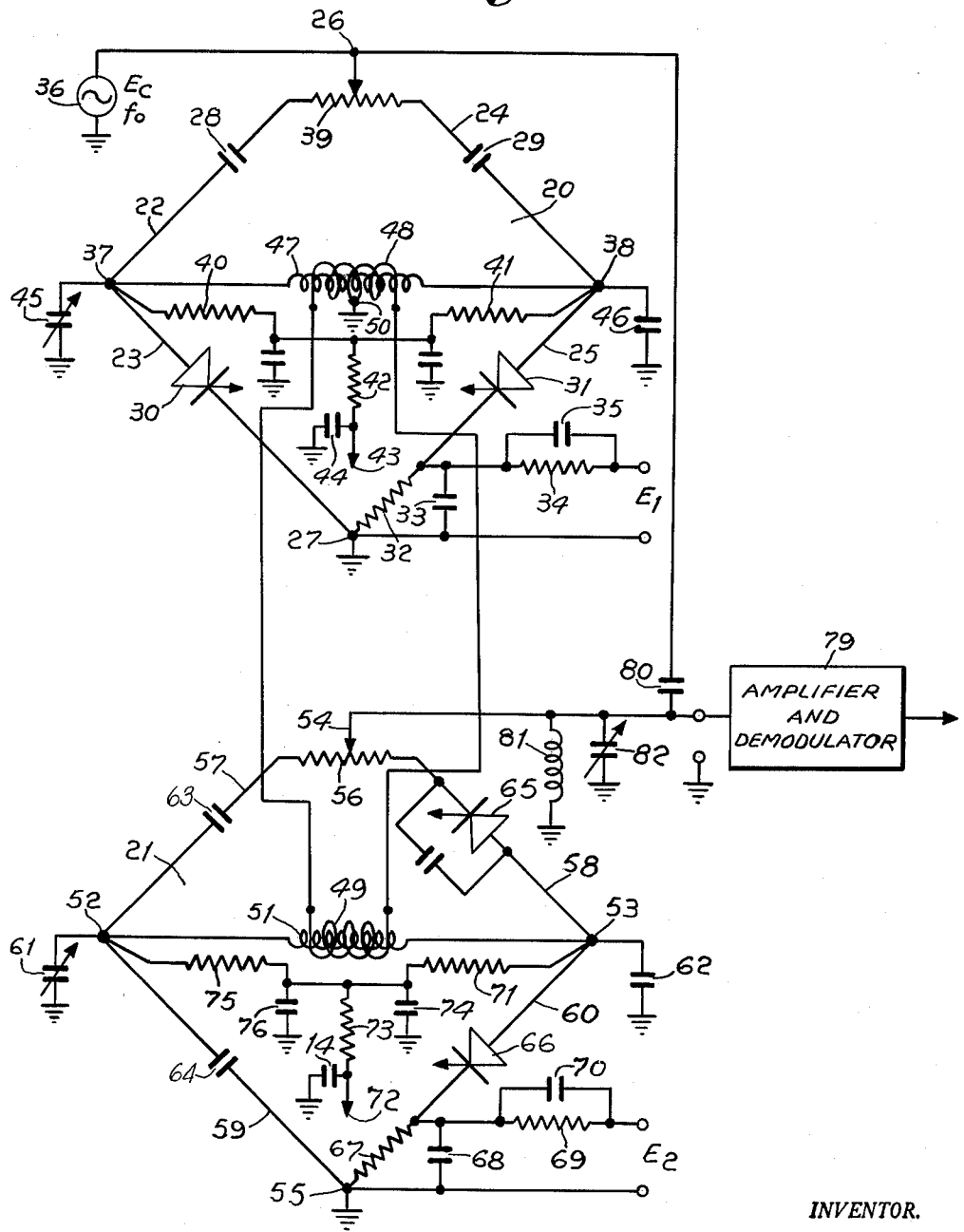

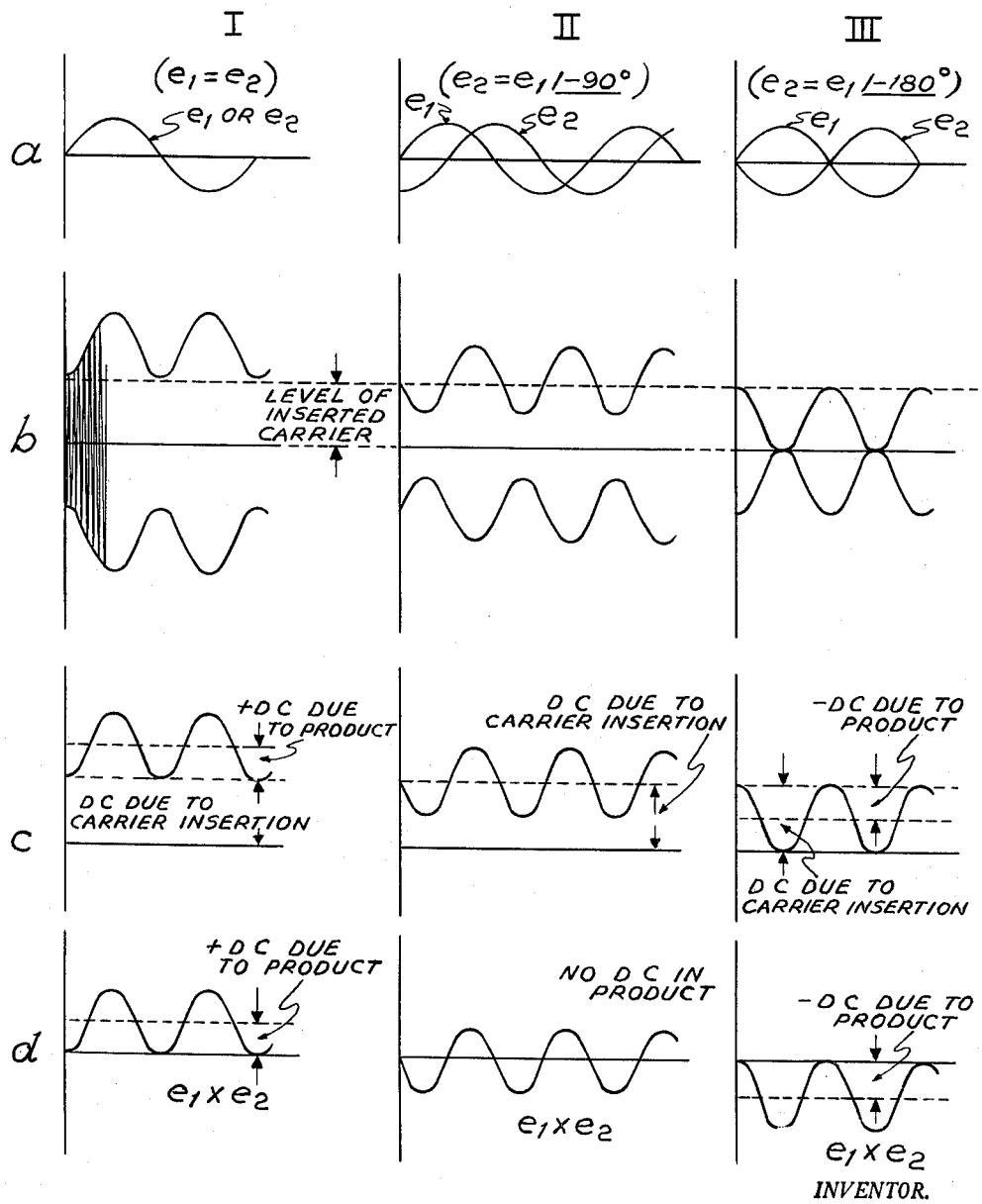

3,202,808
ANALOG SIGNAL MULTIPLIER USING CARRIER INSERTION
Oliver S. Meixell, Caldwell, N.J., assignor to International Telephone and Telegraph Corporation, Nutley, N.J., a corporation of Maryland
Filed Jan. 15, 1962, Ser. No. 166,034
9 Claims. (Cl. 235—194)

This invention relates to analog signal multipliers and has for its principal object to provide such a multiplier which is simple in construction and easy to adjust and operate.

Another object of the invention is to provide a multiplier which may be used in an instantaneous broadband analog computer and requires a minimum of programming and has a minimum of complexity.

Another object of the invention is to provide an analog signal multiplier in which temperature changes are compensated for.

Other objects and objects relating to the construction and operation of the multiplier will become more apparent and the invention itself will be best understood by reference to the following description taken in conjunction with the accompanying drawings, in which:

FIG. 1 is a circuit diagram illustrating the basic arrangement of one form of multiplier incorporating the invention;

FIG. 2 is a circuit diagram of a multiplier showing the circuitry in greater detail of a preferred form of the invention; and FIG. 3 is a diagram of waveforms illustrating the results obtained with the circuit of the invention.

The multiplier of the invention comprises a plurality of impedance bridge circuits coupled in a cascade arrangement. These bridge circuits are normally balanced and the first is driven across one pair of diagonal points by a carrier frequency which is greater than the highest frequency component of the signals which are to be multiplied. The other pair of diagonal points of the first bridge is coupled to a pair of a diagonal points of the next succeeding bridge circuit, and so on, an output circuit being connected across the other pair of diagonal points of the last bridge circuit. Each signal to be multiplied is fed to a different bridge in a manner to unbalance the bridge. The output of the last bridge is then the product of the signals.

Referring now more specifically to FIG. 1, the basic circuit is shown for multiplying two signals. For this purpose, two identical impedance bridge circuits 1 and 2 are shown. Each of these bridge circuits has an impedance Z in each arm which impedances are preferably equal. The diagonal points 3 and 4 of the bridge circuit 1 are connected across a source 5 of alternating carrier current $E_c$, the frequency of which is greater than the highest frequency component of the signals to be multiplied. The diagonal points 6 and 7 of the bridge 1 are then coupled by means of a balanced-to-ground coupling means 8 to the diagonal points 9 and 10 of the impedance bridge 2. The other diagonal points 11 and 12 of the impedance bridge 2 are connected to an output circuit, indicated at 13.

In order to apply a signal to be multiplied to the impedance bridge 1, means is provided to change the impedance of one of the arms, such as 14. This signal will vary the impedance by an amount which may be represented as $\Delta Z_1$, so that the impedance becomes $Z+\Delta Z_1$. Another signal to be multiplied may be applied to the bridge 2 in a similar manner so as to vary the impedance 15 in accordance with the signal by an amount which may be represented as $\Delta Z_2$, so that this impedance will have the value $Z+\Delta Z_2$.

The alternating current $E_c$ is also applied to the output 13 by means of a carrier insertion device 16, as indicated in the figure.

When the impedance bridge 1 is balanced and the carrier voltage $E_c$ is applied across the diagonal points 3 and 4, no voltage difference appears at the diagonal points 6 and 7, and therefore no energy is supplied to the coupling circuit 8 and no voltage is applied to the impedance bridge 2. When, however, the impedance 14 of the bridge 1 is varied by the signal $\Delta Z_1$ applied thereto, bridge 1 becomes unbalanced and a voltage difference proportional to the signal will appear at the diagonal points 6 and 7 and will be delivered to the coupling means 8, so that a corresponding voltage will be delivered to the diagonal points 9 and 10 of the impedance bridge 2.

Now, if the impedance bridge 2 is balanced, no output will appear across the diagonals 11 and 12. But, with a variation $\Delta Z_2$ of the impedance 15 caused by the signal applied thereto, the bridge 2 will be unbalanced and an output will appear across the diagonal points 11 and 12. This output will be a function of the product of the two input signals, and when the voltage $E_c$ is added to it by the insertion means 16, and the resulting signal demodulated, the true product of the two signals may be obtained.

The impedances 14 and 15 in the bridge circuits 1 and 2 may be varied in accordance with the input signals in any desired way by mechanical or electrical means. However, the variation of the impedances should be prevented from exceeding 0.1 of the impedance in the balanced condition. If the variation tends to exceed this value, certain distortion will be introduced so that a true product of the signals cannot be obtained. This distortion may be decreased by causing the signals to vary additional impedances of the two bridges with the proper signs, so that greater amplitudes in the product may be obtained in this manner.

If we assume that bridge 1 is unbalanced by changing the impedance of one of its arms from Z to $Z+\Delta Z_1$ and also that bridge 2 is unbalanced similarly by changing the impedance of one of its arms from Z to $Z+\Delta Z_2$, then the fractional unbalances may be expressed by observing that $$Z+\Delta Z_1 = Z\left(1+\frac{\Delta Z_1}{Z}\right) = Z(1+\epsilon_1) \qquad (1)$$

$$Z+\Delta Z_2 = Z\left(1+\frac{\Delta Z_2}{Z}\right) = Z(1+\epsilon_2) \qquad (2)$$

where $\epsilon_1$ and $\epsilon_2$ are the respective fractional unbalances.

If these fractional unbalances are small in comparison with unity (0.1 or less), as stated above, the output voltage $E_{out}$, when the voltage $E_c$ has been re-inserted, will have the form of a double modulation of $E_c$. Its modulation envelope is proportional to the undistorted product of the fractional unbalances, i.e., envelope of $$E_{out} = K\epsilon_1\epsilon_2 \qquad (3)$$

where K is a proportionality constant including the voltage $E_c$.

While various practical embodiments of the foregoing basic multiplier are possible, one of the more valuable structures which may be preferred utilizes voltage-variable capacitors to produce a change of impedance $\Delta Z$ which is proportional to an applied signal voltage. With $\Delta Z_1$ proportional to a signal $E_1$, and $\Delta Z_2$ proportional to signal $E_2$, the envelope of $E_{out}$ is proportional to the instantaneous product given by envelope of $$E_{out} = K_1 E_1 E_2 \qquad (4)$$

where $K_1$ is a proportionality constant including $E_c$.

Upon amplification and demodulation of the envelope of $E_{out}$ by means well known in the art, the true instantaneous four-quadrant product of the two signals $E_1$ and $E_2$ is obtained.

In FIG. 2 a preferred circuit arrangement of a multiplier incorporating the above mentioned features is shown. In this figure, bridge circuits 20 and 21 are shown which correspond to the bridge circuits 1 and 2 of FIG. 1. Bridge circuit 20 comprises four arms 22, 23, 24, and 25 with the diagonal points 26 and 27 connected between the arms 22 and 24 and 23 and 25, respectively. Arm 22 is provided with a capacitor 28 and, similarly arm 24 is provided with a capacitor 29. These capacitors may be fixed capacitors, and I have found that a value of 40 micro-microfarads is suitable for each. The arms 23 and 25 are provided with voltage-variable capacitors 30 and 31, respectively, the type known as Varicaps having been found satisfactory. The voltage variable capacitor 30 serves solely to compensate for changes due to temperature variations and changes due to the presence of carrier voltage. The voltage variable capacitor 31 is caused to vary its capacity with a signal $E_1$ by applying this signal across a resistor 32 of 100 ohms which is placed in series with the voltage variable capacitor. Suitable means to furnish an aperiodic input circuit may be provided in the capacitor 33 connected across resistor 32 and the parallel arrangement of a resistor 34 and capacitor 35 connected in series with one side of the input.

The driving voltage is applied to the diagonal points 26 and 27 from a source 36 which produces a voltage $E_c$ at a frequency $f_0$. Diagonal points 37 and 38 are connected respectively between the arms 22 and 23 and 24 and 25 and form the output for the bridge.

A trimmer potentiometer 39 is connected between the ends of the arms 22 and 24 of the bridge and the diagonal point 26 is connected to the movable arm of the potentiometer. This potentiometer may be adjusted in order to balance the bridge.

In order to bias the voltage variable capacitors 30 and 31, I connect resistors 40 and 41, respectively, to the diagonal points 37 and 38 and connect the other ends of these resistors through a resistor 42 to a biasing voltage, indicated at 43. The point 43 may be connected by means of a capacitor 44 to ground.

Trimming capacitors 45 and 46 may be connected respectively to the diagonal points 37 and 38, one of these capacitors, for example 46, being fixed and the other being adjustable, thus providing an additional adjustment to aid in balancing the bridge circuit.

In FIG. 1, a balanced-to-ground coupling means 7 is shown coupling the bridge circuits 1 and 2. In FIG. 2, a similar coupling circuit is provided. This coupling circuit is arranged as follows: a coil 47 is connected between the diagonal points 37 and 38. This coil forms the primary of a transformer with a secondary 48 surrounding it. The ends of the secondary 48 are connected directly to the ends of a primary winding 49 associated with the bridge circuit 21. The center point of the secondary 48 is connected to ground as at 50. In the bridge circuit 21 the primary winding 49 is coupled to a secondary winding 51 which is connected between diagonal points 52 and 53 of the bridge circuit 21.

The other diagonal points 54 and 55 of the bridge circuit 21 correspond to the diagonal points 26 and 27 of the bridge circuit 20. The diagonal point 55 is connected to ground and the diagonal point 54 is connected to the contact of a potentiometer 56, the ends of which are connected between the arms 57 and 58 which, in turn, are connected respectively between the diagonal points 52 and 53 and the diagonal point 54. The other arms 59 and 60 are connected respectively between the diagonal points 52 and 55 and 53 and 55. Trimming capacitors 61 and 62 are connected to the diagonal points 52 and 53 and are arranged similarly to the capacitors 45 and 46 of the bridge 20, the capacitor 61 being adjustable so that the balance of the circuit may be adjusted.

The arms 57 and 59 of the bridge circuit 21 are provided respectively with fixed capacitors 63 and 64. The arms 58 and 60 are provided with voltage variable capacitors 65 and 66, respectively, the latter adapted to be varied by the incoming signal $E_2$ which is applied across a resistor 67, similar circuitry as in bridge circuit 20, including the capacitor 68 and the parallel resistor 69 and capacitor 70 connected in series in the input lead being used to prevent resonating.

A bias is provided for the voltage variable capacitors 65 and 66 in the form of a resistor 71 connected to the diagonal point 53, the other end being connected to a source of bias voltage, indicated at 72 through a resistor 73, a bypass capacitor 14 being connected between the point 72 and ground. A bypass capacitor 74 is also connected between the end of resistor 71 and ground. In order to balance the effect of the resistor 71 and the capacitor 74, a similar resistor 75 is connected between the diagonal point 52 and resistor 73 and a capacitor 76 is connected between the junction of these resistors and ground.

The output of the bridge circuit 21 is connected across the diagonal points 54 and 55. This output comprises an amplifier and demodulator 79 of known construction and the alternating current carrier input from the source 36 is coupled to the output circuit by means of a capacitor 80 in order to re-insert the carrier frequency. An inductance 81 and a capacitor 82 in parallel therewith is also connected across the diagonal points 54 and 55 and the values of these elements are chosen so that, together with the capacity of the amplifier 79, the inductance of the output circuit will equal the inductance of the coil 51 across the other diagonals 52 and 53.

In the operation of the circuit, a carrier frequency is applied across the diagonal points 26 and 27 of the first bridge circuit 20. If the circuit is accurately balanced, no output will appear across the diagonal points 37 and 38. When, however, the signal $E_1$ is applied across the resistor 32, current through the voltage variable capacitor 31 will cause the capacity thereof to vary in accordance with the signal $E_1$, so as to unbalance the bridge 20 in accordance with this signal. This causes an output from the diagonal points 37 and 38 which is applied by means of the coupling coils 47, 48, 49, and 51 to the diagonal points 52 and 53 of the bridge 21. If this bridge is accurately balanced, no output will appear across diagonals 54 and 55. However, if the signal $E_2$ is applied across the resistor 67, current through the voltage variable capacitor 66 will vary in accordance with the signal and the capacity of this voltage variable capacitor will change correspondingly, so that the unbalance of the bridge 21 will vary in accordance with the signal $E_2$. Thus, a wave proportional to the product of the signals $E_1$ and $E_2$ will appear in the output circuit, and after having the carrier $E_c$ re-inserted over the capacitor 80, the composite signal is amplified and demodulated by the amplifier and demodulator 79 to produce the product of the two signals $E_1$ and $E_2$.

An analysis of the foregoing may be made by describing signals $E_1$ and $E_2$ in terms of $e_1$ and $e_2$, their respective instantaneous values. First, let $e_1$ and $e_2$ be in-phase, sinusoidal voltages at the same frequency. This elementary case is described by $$e_1 = E_{1m} \sin \omega_1 t \qquad (5)$$
$$e_2 = E_{2m} \sin \omega_1 t \qquad (6)$$

where $E_{1m}$ and $E_{2m}$ are maximum values of $e_1$ and $e_2$, respectively, and where both voltages are at an instantaneous angle of $\omega_1 t$ ($\omega_1 t = 2\pi f_1 t$ with $f_1$=frequency in c.p.s. and $t$=time in seconds).

Similarly, let the applied carrier voltage ($E_c$) be described by $$e_c = E_{cm} \sin \omega_0 t \qquad (7)$$

where $e_c$ is an instantaneous sin-wave carrier voltage which has a maximum value of $E_{cm}$ and an instantaneous angle of $\omega_0 t (\omega_0 t = 2f_0 t$ with $f_0 =$ carrier frequency in c.p.s. and $t =$ time in seconds).

When the signal $e_1$ is applied across resistor 32, as in FIG. 2, bridge 20 becomes unbalanced in accord with the sinusoidal variations of $e_1$. This causes a suppressed-carrier modulated unbalance voltage output from the diagonal points 37 and 38 of the form:

$$e_{37/38} = K_a e_c e_1 \qquad (8)$$

where $K_a$ is a proportionality constant.

Similarly, when $e_{37/38}$ is coupled to the diagonal points 52 and 53, bridge 21 becomes unbalanced in accordance with the sinusoidal variations of the signal $e_2$. This causes an output voltage to appear at the diagonal points 54 and 55 of bridge 21 in the form of a further modulation of $e_{37/38}$ as described by $$e_{54/55} = K_b e_{37/38} e_2 \qquad (9)$$

where $K_b$ is a proportionality constant.

Substituting the value for $e_{37/38}$, Equation 8, into Equation 9, we have $$e_{54/55} = K_a K_b e_c e_1 e_2 \qquad (10)$$

and, by further substitution of the values for $e_1$, $e_2$, and $e_c$ (Equations 5, 6, and 7, respectively) into Equation 10, there results $$e_{54/55} = K_a K_b E_{cm} E_{1m} E_{2m} (\sin \omega_0 t \sin \omega_1 t \sin \omega_1 t) \qquad (11)$$

By trigonometric expansion of the terms of Equation 11, it can be demonstrated that $e_{54/55}$ is an amplitude-modulated wave whose envelope, for a constant carrier voltage ($E_c$), is proportional to the instantaneous product of $E_1$ and $E_2$.

Now let $e_2 = E_{2m} \sin (\omega_1 t + \theta)$ i.e., at a phase angle of $\theta$ relative to $e_1$. Thus, Equation 11 becomes $$e_{54/55} = K_a K_b E_{cm} E_{1m} E_{2m} [\sin \omega_0 t \sin \omega_1 t \sin (\omega_1 t + \theta)] \qquad (12)$$

It can be shown readily that the envelope of $e_{54/55}$ no longer describes the instantaneous product of $E_1$ and $E_2$ except where $\theta = 0$, in which case Equations 12 and 11 are identical. In order for the envelope to properly yield the product for any value of $\theta$, it is necessary to re-insert a fraction of the carrier voltage over capacitor 80, as shown in FIG. 2. Let this re-inserted carrier be defined by $$e_c' = K_c E_{cm} \sin \omega_0 t \qquad (13)$$

where $K_c$ is typically $\frac{1}{10}$, or less.

The re-inserted voltage, described by Equation 13 is added to that defined by Equation 12 to become the input to the amplifier and demodulator 79. This summation is thus described by $$e_{\text{input}} = K_c E_{cm} \sin \omega_0 t + K_a K_b E_{cm} E_{1m} E_{2m} [\sin \omega_0 t \sin \omega_1 t \sin(\omega_1 t + \theta)] \qquad (14)$$

The envelope of $e_{\text{input}}$ now defines the instantaneous true product of $E_1$ and $E_2$, irrespective of their relative phase. This product is obtained at the output of the amplifier and demodulator 79.

FIGURE 3 illustrates the step-by-step results of multiplying two equal-amplitude sine waves $e_1$ and $e_2$ which are at the same frequency but which have three different values of the phase angle $\theta$. In column I, the two sine waves are in phase; in column II they are 90° out of phase; and in column III, they are 180° out of phase. The figure is believed to be self-explanatory but it is noteworthy that row $b$ is a graphical presentation of Equation 14 which describes the input to the amplifier and demodulator. It should be clear from the waveforms in this row that, in the absence of carrier insertion, there would be over-modulation and intolerable distortion of the envelope except for the in-phase condition of $e_1$ and $e_2$. Thus, the envelope could no longer describe the true product for all values of the phase angle $\theta$. When $e_1$ and $e_2$ are not sinusoidal and are of unlike waveforms, it is impossible to obtain a suitable product under any condition in the absence of carrier insertion.

The circuit of the invention has many different uses. As an analog multiplier it may be used, for example, in an instantaneous broadband analog computer requiring a minimum of programming and providing a minimum of complexity.

It may also be used to improve signal-to-noise ratio in diverse types of radar and comunication systems receiving pulse signals by producing correlating pulses at the same repetition rate and adjusting the timing of the correlating pulses until they coincide with the received pulse signals. The pulse signals would be applied to one of the bridge circuits, while the correlating signals would be applied to the other. When the two signals coincide, the product will definitely exceed the noise signal, so as to distinguish the desired signals clearly from the noise.

The circuit may also be used for analysis of non-sinusoidal waves. For this purpose, a sine wave may be applied to the input of one bridge and the non-sinusoidal wave to the input of the other bridge.

Use of the circuit in an electronic commutator for phase-shift keying a carrier or modulation of a carrier may also be found effective. In this case, the carrier excitation is applied to one pair of diagonals of the bridge, while keyed impulses of positive or negative voltage are applied to the input.

While I have described above the principles of my invention in connection with specific apparatus, it is to be clearly understood that this description is made only by way of example and not as a limitation to the scope of my invention, as set forth in the objects thereof and in the accompanying claims.

I claim:
1. An analog signal multiplier comprising:
 (a) a first normally balanced bridge circuit,
 (b) means for applying an alternating current across a first diagonal of said first bridge circuit having a frequency higher than the highest frequency component of the signals to be multiplied,
 (c) means for causing a first of said signals to unbalance said first bridge circuit in correspondence with said first signal,
 (d) a second normally balanced bridge circuit,
 (e) means for coupling the second diagonal of said first bridge circuit to the first diagonal of said second bridge circuit,
 (f) means for causing a second of said signals to unbalance said second bridge circuit in correspondence with said second signal,
 (g) an output circuit connected across the second diagonal of said second bridge circuit and
 (h) means for applying said alternating current across said output circuit.

2. An analog signal multiplier, as defined in claim 1, in which the means for causing a signal to unbalance the bridge circuit to which it is applied comprises:
 (a) a variable impedance in one arm of said bridge circuit, and
 (b) means for causing said signal to vary said impedance.

3. An analog signal multiplier, as defined in claim 2, in which the variable impedance is a voltage variable capacitor and the means for causing the signal to vary the impedance thereof comprises means for applying said signal in series with said voltage variable capacitor.

4. An analog signal multiplier, as defined in claim 3, in which the means for coupling the second diagonal of the first bridge circuit to the first diagonal of the second bridge circuit is balanced to ground.

5. An analog signal multiplier, as defined in claim 4, in which the balanced-to-ground coupling means is a balanced-to-ground transformer.

6. An analog signal multiplier, as defined in claim 1, in which the means for coupling the second diagonal of the first bridge circuit to the first diagonal of the second bridge circuit is balanced to ground.

7. An analog signal multiplier, as defined in claim 1, in which the means for unbalancing the first bridge by the first signal comprises a voltage variable capacitor in one arm of the bridge circuit and means for applying the first signal in series with said voltage variable capacitor, and in which another voltage variable capacitor of substantially the same characteristics is connected in an adjacent arm of said bridge circuit.

8. An analog signal multiplier, as defined in claim 7, in which the output circuit comprises an amplifier and demodulator.

9. An analog signal multiplier, as defined in claim 1, in which the output circuit comprises an amplifier and demodulator.

References Cited by the Examiner

UNITED STATES PATENTS 2,393,708  1/46  Reichel.
2,921,739  1/60  Tolles _____ 235—194

MALCOLM A. MORRISON, *Primary Examiner.*